United States Patent
Malkin

(10) Patent No.: US 11,455,059 B1
(45) Date of Patent: Sep. 27, 2022

(54) DISPLAY LINE AWARE NOISE MITIGATION FOR TOUCH SCREENS

(71) Applicant: Apple Inc., Cupertino, CA (US)

(72) Inventor: Moshe Malkin, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/781,832

(22) Filed: Feb. 4, 2020

Related U.S. Application Data

(60) Provisional application No. 62/821,929, filed on Mar. 21, 2019.

(51) Int. Cl.
*G06F 3/041* (2006.01)

(52) U.S. Cl.
CPC .......... *G06F 3/0418* (2013.01); *G06F 3/0412* (2013.01); *G06F 3/04166* (2019.05)

(58) Field of Classification Search
CPC ... G06F 3/0418; G06F 3/04166; G06F 3/0412
See application file for complete search history.

(56) References Cited

U.S. PATENT DOCUMENTS

| | | |
|---|---|---|
| 4,290,061 A | 9/1981 | Serrano |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,479,122 B2 | 11/2002 | Sakamoto et al. |

(Continued)

FOREIGN PATENT DOCUMENTS

| | | |
|---|---|---|
| JP | 2000-163031 A | 6/2000 |
| JP | 2002-342033 A | 11/2002 |
| WO | 2015/050888 A1 | 4/2015 |

OTHER PUBLICATIONS

Lee et al., "A Multi-Touch Three Dimensional Touch-Sensitive Tablet", CHI'85 Proceedings, Apr. 1985, pp. 21-25.

(Continued)

*Primary Examiner* — Adam R. Giesy
(74) *Attorney, Agent, or Firm* — Kubota & Basol LLP

(57) ABSTRACT

Noise introduced into touch sensor panel measurements, for example, from display data lines of a display device proximate to the touch sensor panel, can be reduced. In some examples, touch sensing operations and display operations can be synchronized. For example, touch sensing scans (or scan steps) can begin with the rising edge of a display line synchronization signal. Additionally, the display noise can be characterized for the system. Display noise characterization and timing synchronization can be used to discard touch sensing samples including display noise injected into the touch sensor panel that may be synchronized to the display data line synchronization signal. In some examples, a window can be generated based on the characterized display noise, and the window can be applied to annihilate display noise. The application of the window can be time-dependent to account for offsets between the occurrence of the display noise and the touch sensing operation.

21 Claims, 9 Drawing Sheets

(56) References Cited

U.S. PATENT DOCUMENTS

| | | |
|---|---|---|
| 6,690,387 B2 | 2/2004 | Zimmerman et al. |
| 6,947,373 B2 | 9/2005 | Siala et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 2006/0197753 A1 | 9/2006 | Hotelling |
| 2011/0057890 A1 | 3/2011 | Goo et al. |
| 2011/0298759 A1* | 12/2011 | Yang ................... G06F 3/04184 345/178 |
| 2012/0050217 A1* | 3/2012 | Noguchi ............... G06F 3/0446 345/174 |
| 2013/0082954 A1* | 4/2013 | Azumi ................ G06F 3/04166 345/173 |
| 2015/0091861 A1* | 4/2015 | Tanaka ................. G06F 3/0443 345/174 |
| 2018/0107338 A1* | 4/2018 | Chung ................ G06F 3/04182 |

OTHER PUBLICATIONS

Rubine, Dean H., "Combining Gestures and Direct Manipulation", CHI'92, May 3-7, 1992, pp. 659-660.

Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

* cited by examiner

DISPLAY LINE AWARE NOISE MITIGATION FOR TOUCH SCREENS

CROSS-REFERENCE TO RELATED APPLICATION

This application claims benefit of U.S. Provisional Patent Application No. 62/821,929, filed Mar. 21, 2019, the contents of which is hereby incorporated by reference in its entirety for all purposes.

FIELD OF THE DISCLOSURE

This relates generally to devices including a touch screen and, more specifically, to touch-sensitive devices configured to reduce noise levels.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electric fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes or sensing electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

In some cases, the proximity between a capacitive touch sensor panel and the display can allow for noise from the display circuitry to degrade the performance of the capacitive touch sensor panel. The amount of noise interference can increase as the distance between the capacitive touch sensor panel and the display decreases. In some examples, touch and display operations can be time-multiplexed to mitigate noise such that the touch operations occur during pauses in the display refresh.

SUMMARY OF THE DISCLOSURE

This relates to reducing display noise interference in touch sensor panel measurements. Noise can be introduced into touch sensor panel measurements, for example, from display data lines (e.g., display electrodes) of a display device proximate to the touch sensor panel (e.g., in a touch screen). In some examples, touch sensing operations and display operations can be synchronized. For example, touch sensing scans (or scan steps) can begin with the rising edge of a display line synchronization signal. Additionally, the display noise can be characterized (e.g., as a function of time, and with relation to the display line synchronization signal) for the system. Display noise characterization and timing synchronization can be used to discard touch sensing samples overlapping with display noise injected into the touch sensor panel that may be synchronized to the display data line synchronization signal. In some examples, a window can be generated based on the characterized display noise, and the window can be applied to annihilate display noise. The application of the window can be time-dependent to account for offsets between the occurrence of the display noise and the touch sensing operation.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to reducing display noise interference in touch sensor panel measurements. Noise can be introduced into touch sensor panel measurements, for example, from display data lines (e.g., display electrodes) of a display device proximate to the touch sensor panel (e.g., in a touch screen). In some examples, touch sensing operations and display operations can be synchronized. For example, touch sensing scans (or scan steps) can begin with a triggering edge (e.g., the rising edge) of a display line synchronization signal. The display line synchronization signal, as used herein, can refer to a timing signal indicative of (and that triggers) display data line transitions (e.g., to update the image on a portion of or all of the display). Additionally, the display noise can be characterized (e.g., as a function of time, and with relation to the display line synchronization signal) for the system. Display noise characterization and timing synchronization can be used to discard touch sensing samples overlapping with display noise injected into the touch sensor panel that may be synchronized to the display data line synchronization signal. In some examples, a window can be generated based on the characterized display noise, and the window can be applied to annihilate display noise. The application of the window can be time-dependent to account for offsets between the occurrence of the display noise and the touch sensing operation.

Figure 1A:
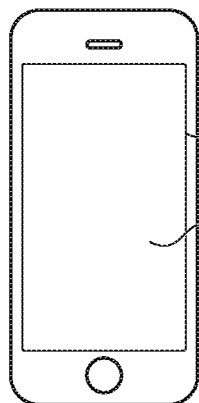
FIGS. 1A-1E illustrate example systems that can implement touch sensing and display line aware noise mitigation according to examples of the disclosure.
Figure 1B:
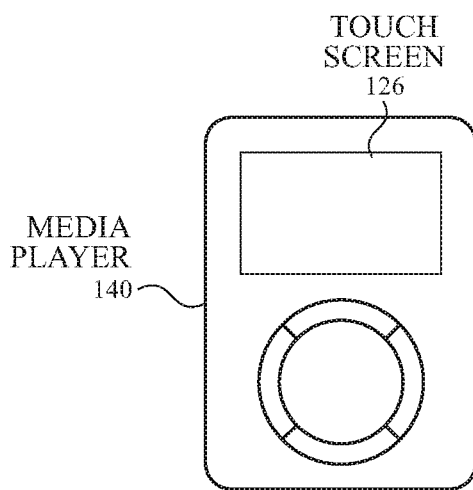
Figure 1C:
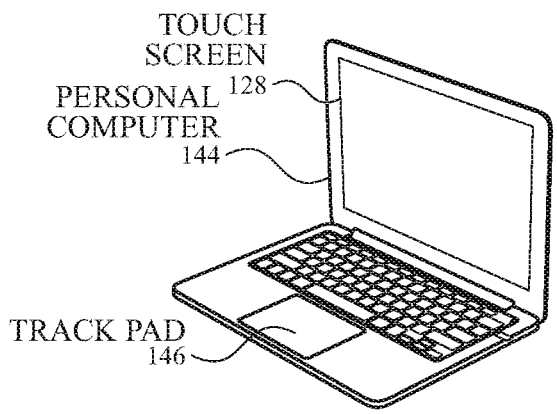
Figure 1D:
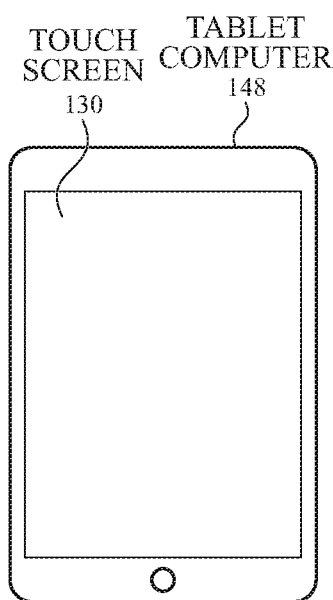
Figure 1E:
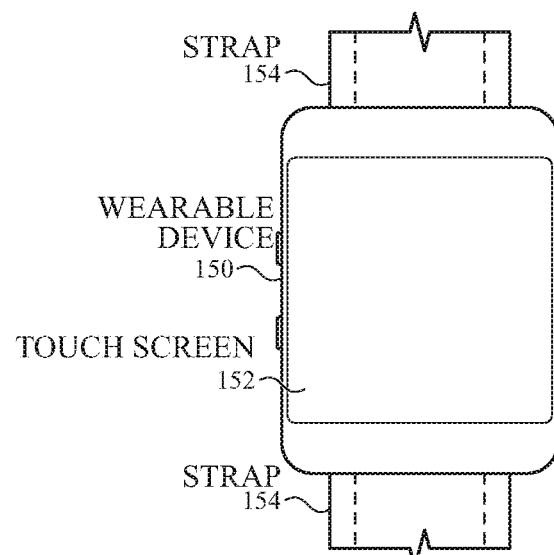

FIGS. 1A-1E illustrate example systems that can implement touch sensing and display line aware noise mitigation according to examples of the disclosure. FIG. 1A illustrates an example mobile telephone 136 that includes a touch screen 124 and a computing system that can implement display line aware noise mitigation according to examples of the disclosure. FIG. 1B illustrates an example digital media player 140 that includes a touch screen 126 and a computing system that can implement display line aware noise mitigation according to examples of the disclosure. FIG. 1C illustrates an example personal computer 144 that includes a touch screen 128 and a computing system that can implement display line aware noise mitigation according to examples of the disclosure. FIG. 1D illustrates an example tablet computing device 148 that includes a touch screen 130 and a computing system that can implement display line aware noise mitigation according to examples of the disclosure. FIG. 1E illustrates an example wearable device 150 that includes touch screen 152 and a computing system and can be attached to a user using a strap 154 and that can implement display line aware noise mitigation according to examples of the disclosure. The touch screen and computing system that can implement touch sensing and display line aware noise mitigation can be implemented in other devices.

Touch screens 124, 126, 128, 130 and 152 can be based on, for example, self-capacitance or mutual capacitance sensing technology, or another touch sensing technology. For example, a self-capacitance based touch system can include a matrix of small, individual plates of conductive material that can be referred to as touch node electrodes (as described below with reference to touch screen 420 in FIG. 4). For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material (as described below with reference to touch screen 320 in FIG. 3), and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 152 can be based on mutual capacitance. A mutual capacitance based touch system can include drive and sense lines that may cross over each other on different layers, or may be adjacent to each other on the same layer (e.g., as illustrated in touch screen 320 in FIG. 3). The crossing or adjacent locations can be referred to as touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. In some examples, the electrodes of a mutual-capacitance based touch system can be formed from a matrix of small, individual plates of conductive material, and changes in the mutual capacitance between plates of conductive material can be detected, similar to above.

Figure 2:
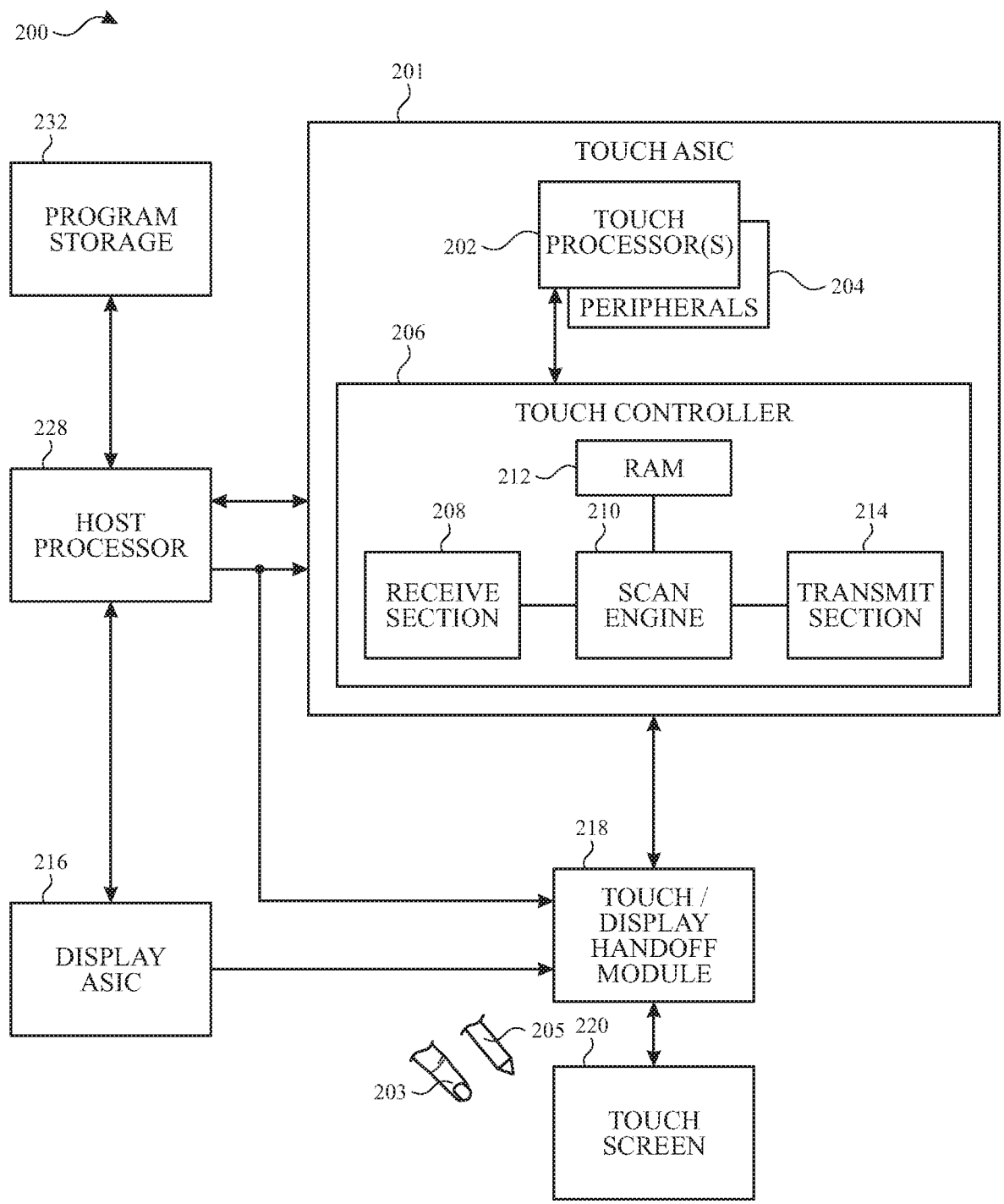
FIG. 2 illustrates a block diagram of an example computing system that can implement touch sensing and display line aware noise mitigation according to examples of the disclosure.

In some examples, touch screens 124, 126, 128, 130 and 152 can be based on mutual capacitance and/or self-capacitance. The electrodes can be arranged as a matrix of small, individual plates of conductive material (e.g., as in touch screen 420 in FIG. 4) or as drive lines and sense lines (e.g., as in touch screen 320 in FIG. 3), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof FIG. 2 illustrates a block diagram of an example computing system that can implement touch sensing and display line aware noise mitigation according to examples of the disclosure. Computing system 200 could be included in, for example, mobile telephone 136, digital media player 140, personal computer 144, tablet computing device 148, wearable device 150, or any mobile or non-mobile computing device that includes a touch screen. Computing system 200 can include an integrated touch screen 220 to display images and to detect touch and/or proximity (e.g., hover) events from an object (e.g., finger 203 or active or passive stylus 205) at or proximate to the surface of the touch screen 220. Computing system 200 can also include an application specific integrated circuit ("ASIC") illustrated as touch ASIC 201 to perform touch and/or stylus sensing operations. Touch ASIC 201 can include one or more touch processors 202, peripherals 204, and touch controller 206. Touch ASIC 201 can be coupled to touch sensing circuitry of touch screen 220 to perform touch and/or stylus sensing operations (described in more detail below). Peripherals 204 can include, but are not limited to, random access memory (RAM) or other types of memory or storage, watchdog timers and the like. Touch controller 206 can include, but is not limited to, one or more sense channels in receive circuitry 208, panel scan engine 210 (which can include channel scan logic) and transmit circuitry 214 (which can include analog or digital driver logic). In some examples, the transmit circuitry 214 and receive circuitry 208 can be reconfigurable by the panel scan engine 210 based the scan event to be executed (e.g., mutual capacitance row-column scan, mutual capacitance row-row scan, differential mutual capacitance scan, mutual capacitance column-column scan, row self-capacitance scan, column self-capacitance scan, touch spectral analysis scan, stylus spectral analysis scan, stylus scan, etc.). Panel scan engine 210 can access RAM 212, autonomously read data from the sense channels and provide control for the sense channels (e.g., described in more detail with respect to sense channel 780 in FIG. 7E). The touch controller 206 can also include a scan plan (e.g., stored in RAM 212) which can define a sequence of scan events to be performed at the touch screen. The scan plan can include information necessary for configuring or reconfiguring the transmit circuitry and receive circuitry for the specific scan event to be performed. Results (e.g., touch signals or touch data) from the various scans can also be stored in RAM 212. In addition, panel scan engine 210 can provide control for transmit circuitry 214 to generate stimulation signals at various frequencies and/or phases that can be selectively applied to drive regions of the touch sensing circuitry of touch screen 220. Touch controller 206 can also include a spectral analyzer to determine low noise frequencies for touch and stylus scanning. The spectral analyzer can perform spectral analysis on the scan results from an unstimulated touch screen. Although illustrated in FIG. 2 as a single ASIC, the various components and/or functionality of the touch ASIC 201 can be implemented with multiple circuits, elements, chips, and/or discrete components.

Computing system 200 can also include an application specific integrated circuit illustrated as display ASIC 216 to perform display operations. Display ASIC 216 can include hardware to process one or more still images and/or one or more video sequences for display on touch screen 220. Display ASIC 216 can be configured to generate read memory operations to read the data representing the frame/video sequence from a memory (not shown) through a memory controller (not shown), for example. Display ASIC 216 can be configured to perform various processing on the image data (e.g., still images, video sequences, etc.). In some examples, display ASIC 216 can be configured to scale still images and to dither, scale and/or perform color space conversion on the frames of a video sequence. Display ASIC 216 can be configured to blend the still image frames and the video sequence frames to produce output frames for display. Display ASIC 216 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 216 can be configured to retrieve source frames from one or more source buffers stored in memory, composite frames from the source buffers, and display the resulting frames on touch screen 220. Accordingly, display ASIC 216 can be configured to read one or more source buffers and composite the image data to generate the output frame.

Display ASIC 216 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display ASIC 216 can control the touch screen 220 in real-time, providing the data indicating the pixels to be displayed as the touch screen is displaying the image indicated by the frame. The interface to such a touch screen 220 can be, for example, a video graphics array (VGA) interface, a high-definition multimedia interface (HDMI), a digital video interface (DVI), an LCD interface, an LED display interface, an OLED display interface, a plasma interface, or any other suitable interface.

In some examples, a handoff module 218 can also be included in computing system 200. Handoff module 218 can be coupled to the touch ASIC 201, display ASIC 216, and touch screen 220, and can be configured to interface the touch ASIC 201 and display ASIC 216 with touch screen 220. The handoff module 218 can appropriately operate the touch screen 220 according to the scanning/sensing and display instructions from the touch ASIC 201 and the display ASIC 216. In other examples, the display ASIC 216 can be coupled to display circuitry of touch screen 220 and touch ASIC 201 can be coupled to touch sensing circuitry of touch screen 220 without handoff module 218.

Touch screen 220 can use liquid crystal display (LCD) technology, light emitting polymer display (LPD) technology, light emitting diode (LED) technology, organic LED (OLED) technology, or organic electro luminescence (OEL) technology, although other display technologies can be used in other examples. In some examples, the touch sensing circuitry and display circuitry of touch screen 220 can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of touch screen 220 can be partially or wholly integrated with one another. The integration can be structural and/or functional. For example, some or all of the touch sensing circuitry can be structurally in between the substrate layers of the display. Additionally, some electronic components can be shared, and used at times as touch sensing circuitry and at other times as display circuitry. For example, in some examples, common electrodes can be used for display functions during active display refresh and can be used to perform touch sensing functions during touch sensing periods.

Computing system 200 can also include a host processor 228 coupled to the touch ASIC 201, and can receive outputs from touch ASIC 201 (e.g., from touch processor 202 via a communication bus, such as a serial peripheral interface (SPI) bus, for example) and perform actions based on the outputs. Host processor 228 can also be connected to program storage 232 and display ASIC 216. Host processor 228 can, for example, communicate with display ASIC 216 to generate an image on touch screen 220, such as an image of a user interface (UI), and can use touch ASIC 201 (including touch processor 202 and touch controller 206) to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Computing system 200 can include one or more processors, which can execute software or firmware implementing various functions. Specifically, for integrated touch screens which share components between touch and/or stylus sensing and display functions, the touch ASIC and display ASIC can be synchronized so as to properly share the circuitry of the touch sensor panel. The one or more processors can include one or more of the one or more touch processors 202, a processor in display ASIC 216, and/or host processor 228. In some examples, the display ASIC 216 and host processor 228 can be integrated into a single ASIC, though in other examples, the host processor 228 and display ASIC 216 can be separate circuits coupled together. In some examples, host processor 228 can act as a master circuit and can generate synchronization signals that can be used by one or more of the display ASIC 216, touch ASIC 201 and handoff module 218 to properly perform sensing and display functions for an in-cell touch screen. The synchronization signals can be communicated directly from the host processor 228 to one or more of the display ASIC 216, touch ASIC 201 and handoff module 218. Alternatively, the synchronization signals can be communicated indirectly (e.g., touch ASIC 201 or handoff module 218 can receive the synchronization signals via the display ASIC 216).

Computing system 200 can also include a wireless module (not shown). The wireless module can implement a wireless communication standard such as a WiFi®, BLUETOOTH™ or the like. The wireless module can be coupled to the touch ASIC 201 and/or host processor 228. The touch ASIC 201 and/or host processor 228 can, for example, transmit scan plan information, timing information, and/or frequency information to the wireless module to enable the wireless module to transmit the information to an active stylus, for example (i.e., a stylus capable generating and injecting a stimulation signal into a touch sensor panel). For example, the computing system 200 can transmit frequency information indicative of one or more low noise frequencies the stylus can use to generate stimulation signals. Additionally or alternatively, timing information can be used to synchronize the stylus 205 with the computing system 200, and the scan plan information can be used to indicate to the stylus 205 when the computing system 200 performs a stylus scan and expects stylus stimulation signals (e.g., to save power by generating a stimulus only during a stylus scan period). In some examples, the wireless module can also receive information from peripheral devices, such as an active stylus 205, which can be transmitted to the touch ASIC 201 and/or host processor 228. In other examples, the wireless communication functionality can be incorporated in other components of computing system 200, rather than in a dedicated chip.

Note that one or more of the functions described herein can be performed by firmware stored in memory and executed by the touch processor in touch ASIC 201, or stored in program storage and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
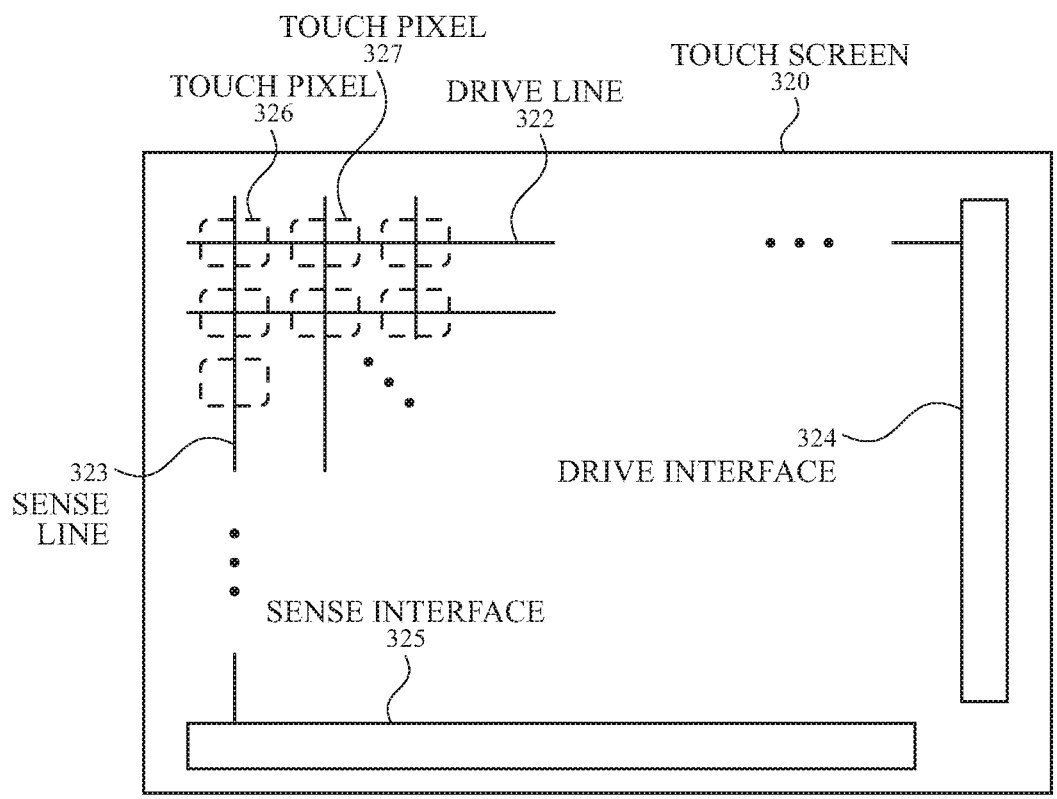
FIG. 3 illustrates an example touch screen including touch sensing circuitry configured as drive and sense regions or lines according to examples of the disclosure.

As discussed above, the touch screen 220 can include touch sensing circuitry. FIG. 3 illustrates an example touch screen including touch sensing circuitry configured as drive and sense regions or lines according to examples of the disclosure. Touch screen 320 can include touch sensing circuitry that can include a capacitive sensing medium having a plurality of drive lines 322 and a plurality of sense lines 323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Additionally, the drive lines 322 and sense lines 323 can be formed from smaller electrodes coupled together to form drive lines and sense lines. Drive lines 322 can be coupled to transmit circuitry and sense lines 323 can be coupled to receive circuitry. As used herein, an electrical component "coupled to" or "connected to" another electrical component encompasses a direct or indirect connection providing electrical path for communication or operation between the coupled components. Thus, for example, drive lines 322 may be directly connected to transmit circuitry or indirectly connected to sense circuitry via drive interface 324, but in either case an electrical path may be provided for driving stimulation signals to drive lines. Likewise, sense lines 323 may be directly connected to sense channels or indirectly connected to sense channels via sense interface 325, but in either case an electrical path may be provided for sensing the sense lines 323. Drive lines 322 can be driven by stimulation signals from the transmit circuitry 214 through a drive interface 324, and resulting sense signals generated in sense lines 323 can be transmitted through a sense interface 325 to sense channels in receive circuitry 208 in touch controller 206. In this way, drive lines and sense lines can be part of the touch sensing circuitry that can interact to form capacitive sensing nodes, which can be thought of as touch nodes, such as touch nodes 326 and 327. This way of understanding can be particularly useful when touch screen 320 is viewed as capturing an "image" of touch (or "touch image"). In other words, after touch controller 206 has determined whether a touch has been detected at each touch node in the touch screen, the pattern of touch pixels in the touch screen at which a touch occurred can be thought of as an "image" of touch (e.g., a pattern of fingers or other objects touching the touch screen).

It should be understood that the row/drive and column/sense associations can be exemplary, and in other examples, columns can be drive lines and rows can be sense lines. In some examples, row and column electrodes can be perpendicular such that touch nodes can have x and y coordinates, though other coordinate systems can also be used, and the coordinates of the touch nodes can be defined differently. It should be understood that touch screen 220 can include any number of row electrodes and column electrodes to form the desired number and pattern of touch nodes. The electrodes of the touch sensor panel can be configured to perform various scans including some or all of row-column and/or column-row mutual capacitance scans, differential mutual capacitance scans, self-capacitance row and/or column scans, row-row mutual capacitance scans, column-column mutual capacitance scans, and stylus scans.

Figure 4:
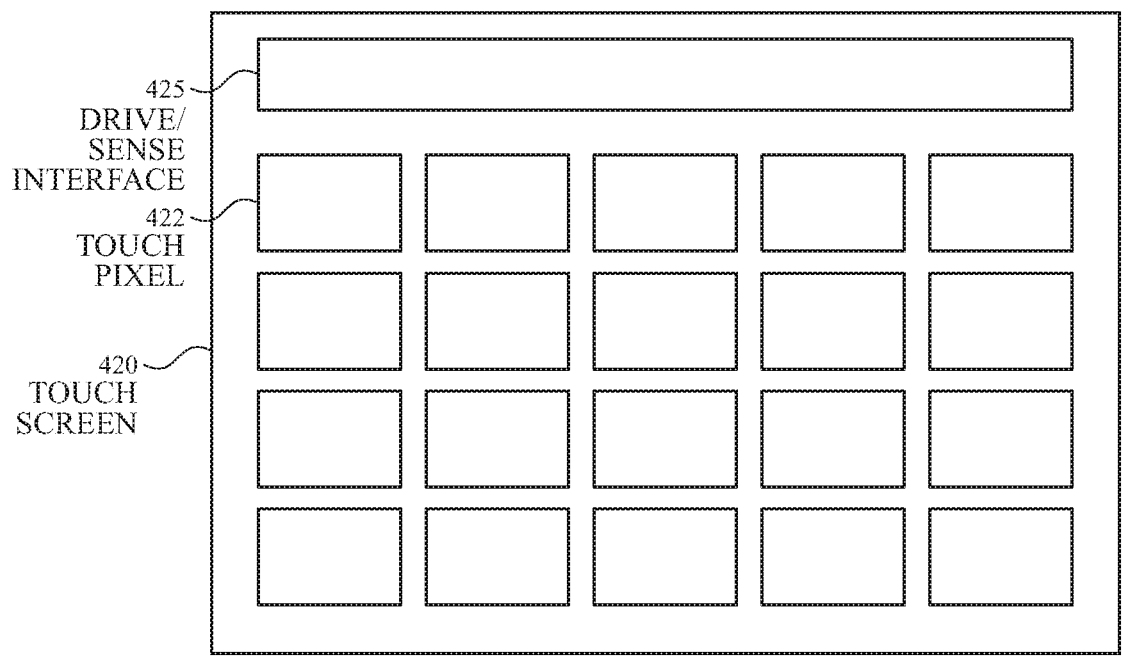
FIG. 4 illustrates an example touch screen including touch sensing circuitry configured as pixelated electrodes according to examples of the disclosure.

Additionally or alternatively, the touch screen can include touch sensing circuitry including an array of touch node electrodes arranged in a pixelated touch node electrode configuration. FIG. 4 illustrates an example touch screen including touch sensing circuitry configured as pixelated touch node electrodes according to examples of the disclosure. Touch screen 420 can include touch sensing circuitry that can include a plurality of individual touch node electrodes 422, each touch node electrode identifying or representing a unique location on the touch screen at which touch or proximity (i.e., a touch or proximity event) is to be sensed, and each touch node electrode being electrically isolated from the other touch node electrodes in the touch screen/panel. Touch node electrodes 408 can be on the same or different material layers on touch screen 420. In some examples, touch screen 420 can sense the self-capacitance of touch node electrodes 422 to detect touch and/or proximity activity on touch screen 420. For example, in a self-capacitance configuration, touch node electrodes 422 can be coupled to sense channels in receive circuitry 208 in touch controller 206, can be driven by stimulation signals from the sense channels (or transmit circuitry 214) through drive/sense interface 425, and can be sensed by the sense channels through the drive/sense interface as well, as described above. Labeling the conductive plates used to detect touch (i.e., touch node electrodes 422) as "touch pixel" electrodes can be particularly useful when touch screen 420 is viewed as capturing an "image" of touch. In other words, after touch controller 206 has determined an amount of touch detected at each touch node electrode 422 in touch screen 420, the pattern of touch node electrodes in the touch screen at which a touch occurred can be thought of as an "image" of touch (e.g., a pattern of fingers or other objects touching the touch screen). In some examples, touch screen 420 can sense the mutual capacitance between touch node electrodes 422 to detect touch and/or proximity activity on touch screen 420. It is understood, that principles of the display line aware noise mitigation can be applied to a pixelated touch sensor panel, or a row-column touch sensor panel configured to detect mutual capacitance or self-capacitance.

As described herein, display operations can be an aggressor for the touch sensing system by introducing noise (interferers). Some display noise can occur periodically from display clock signals, from display data lines, from display gate lines, etc. A large component of display noise interference can occur during display pixel update (e.g., during the application of a pixel voltage on a display data line to a display pixel). In some examples, the display noise can be mitigated to improve touch sensing performance (e.g., improved SNR). It should be understood that some of the principles described herein could be applied to other sources of noise than display noise.

In some examples, noise mitigation techniques can include time-multiplexing touch and display operations. For example, during a first time period display pixels can be updated in a display refresh operation and during a second time period (non-overlapping with the first time period) the touch sensing scans can be performed (while the display is maintained and not updated). By performing touch operations while the display is not updating, the noise from the display can be mitigated. In some examples, the time-multiplexing can be implemented such that touch operations can be performed during inter-frame and/or intra-frame pauses during the display operation. However, time-multiplexing can limit the functionality of a touch screen device. For example, in some cases, there may be insufficient time available to allocate to separate non-overlapping time periods of operation. Additionally, in some cases, the display may operate in an always-on state in which the display refreshes without providing time for a touch sensing scan to complete. Thus, in some cases simultaneous touch and display operation may be desirable or required.

Figure 5:
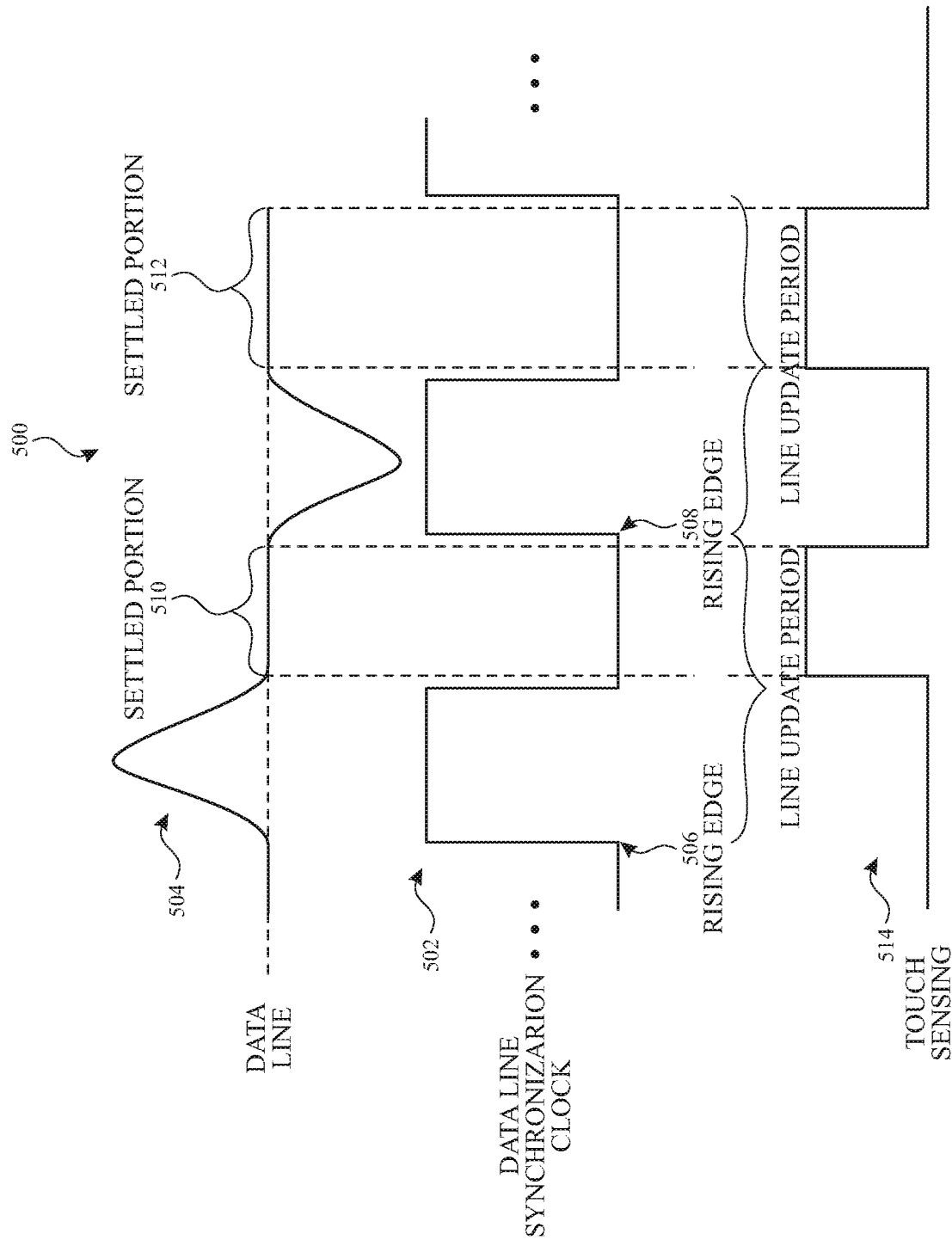
FIG. 5 illustrates and exemplary timing diagram according to examples of the disclosure.

In some examples, noise mitigation techniques can be applied for at least partially overlapping touch and display operations. To mitigate display noise, the touch sensing system can be configured to sample the touch electrodes during a settled period of the display line signal rather than during the transient portion of the display line signal. FIG. 5 illustrates and exemplary timing diagram 500 according to examples of the disclosure. FIG. 5 illustrates a display operation by a display timing signal 502, corresponding, for example, to a display line synchronization signal (i.e., a timing signal indicating display data line transitions). The period between rising edges of display timing signal 502 can correspond to a display line update period. At the rising edge of display timing signal 502, a row of the display can be updated by driving display data to display pixels via display data lines (e.g., columns). After an initial impulse spike on the data line (e.g., from 0V) in response to the display data being driven on the line, the display data voltage can decay and settle back to the initial value (e.g., back to 0V). For example, display data line signal 504 can rise (corresponding to a positive voltage) following (e.g., in response to) rising edge 506 or can fall (corresponding to a negative voltage) following rising edge 508. The display data signal 504 can then return to the initial value (settled value) and remain at the initial value during a settled portion 510, 512. The transient voltage of display data signal 504 can couple to the touch electrodes of a touch sensor panel and appear as noise in touch sensing operations. In some examples, to mitigate the display noise, the touch sensing operations can be performed by scanning and/or sampling the touch electrodes during a settled portion 510, 512, as indicated by the high state of the touch sensing timing signal 514. During noisy portions of the display when display data signal 504 may be transient, the touch sensing operations can be paused or not occurring, as indicated by the low state of touch sensing timing signal 514.

It should be understood that during a display frame, each row of the display can be updated and each of the data lines can be driven with display data to update the displayed imaged. For simplicity of illustration and description, FIG. 5 shows one display timing signal (e.g., data line synchronization clock) and one corresponding display data signal line. It should be understood, however, that the display data signals on other display data signal lines can result in transient signals that can similarly couple into a touch sensor panel and then settle. Although illustrated as updating a row of the display in response to a rising edge of the display timing signal, it should be understood that the update can be in response to a different triggering condition of the display timing signal (e.g., a falling edge). Additionally, the impulse spike on the data line can occur following the triggering edge with some predetermined offset in time to account for delay between the triggering edge of the display timing signal and the update on the data line. In some examples, the transient voltage of the display data signal in response to the rising edge of the display timing signal may vary as a function of the image to be displayed at the display pixel. For example, the polarity and amplitude of the display data signal can be determined based on the pixel color (e.g., amplitude) and/or the pixel driving scheme (e.g., polarity). The transient nature of the signal on the display data line for multiple display data lines can couple as noise into the touch sensor panel in various combinations (e.g., additive, etc.) depending on the image to be displayed. Additionally, although display data signals on display data lines are shown in FIG. 5, it should be understood that other sources of transient voltages in the display system, not limited to display data lines, can contribute noise into the touch sensor panel.

The above mentioned display noise mitigation techniques, however, can rely on a coupled relationship between the touch sensing frequency and the display frequency (i.e., between the touch scanning rate and the display refresh rate). For example, the coupling can require tight synchronization (and associated overhead) to sample the touch electrodes during the settled portions of the display (without sampling the touch electrodes during the transient portions of the display). This coupling can place limitations on the touch sensing device such that a change in display frequency (e.g., a different display refresh rate, a different display technology, etc.) can require a corresponding change in the touch sensing frequency. However, such change in the touch sensing system may be undesirable for a number of reasons (e.g., the touch sensing rate may be selected to avoid other noise aggressors in the device or environment, because the coupling between the display and touch sensing frequencies can limit the touch sensing frequencies available for frequency hopping, etc.) Additionally, sampling during the settled portion limits the collection of samples and the corresponding signal processing to a fraction of the available time for sampling/processing.

In some examples, as described herein, the touch sensing frequency and the display frequency can be decoupled by implementing display line aware touch mitigation techniques. Display line aware touch mitigation techniques can provide increased design flexibility by enabling the touch sensing system to be operated with different display rates and display technologies without requiring much change to the touch sensing system (e.g., by characterizing and updating a window). Additionally, the display line aware touch sensing techniques can improve the processing efficiency and signal-to-noise ratio (SNR) by enabling more samples to be captured and processed. For example, samples can be taken and/or processed during settled and unsettled portions of the display update period, rather than limiting sampling (and thereby the processing) to the settled portions of the display update period. As described below in more detail, the display line aware touch mitigation techniques can operate to either discard noise-affected samples or to remove (or reduce) the noise from noise-affected samples.

Figure 6:
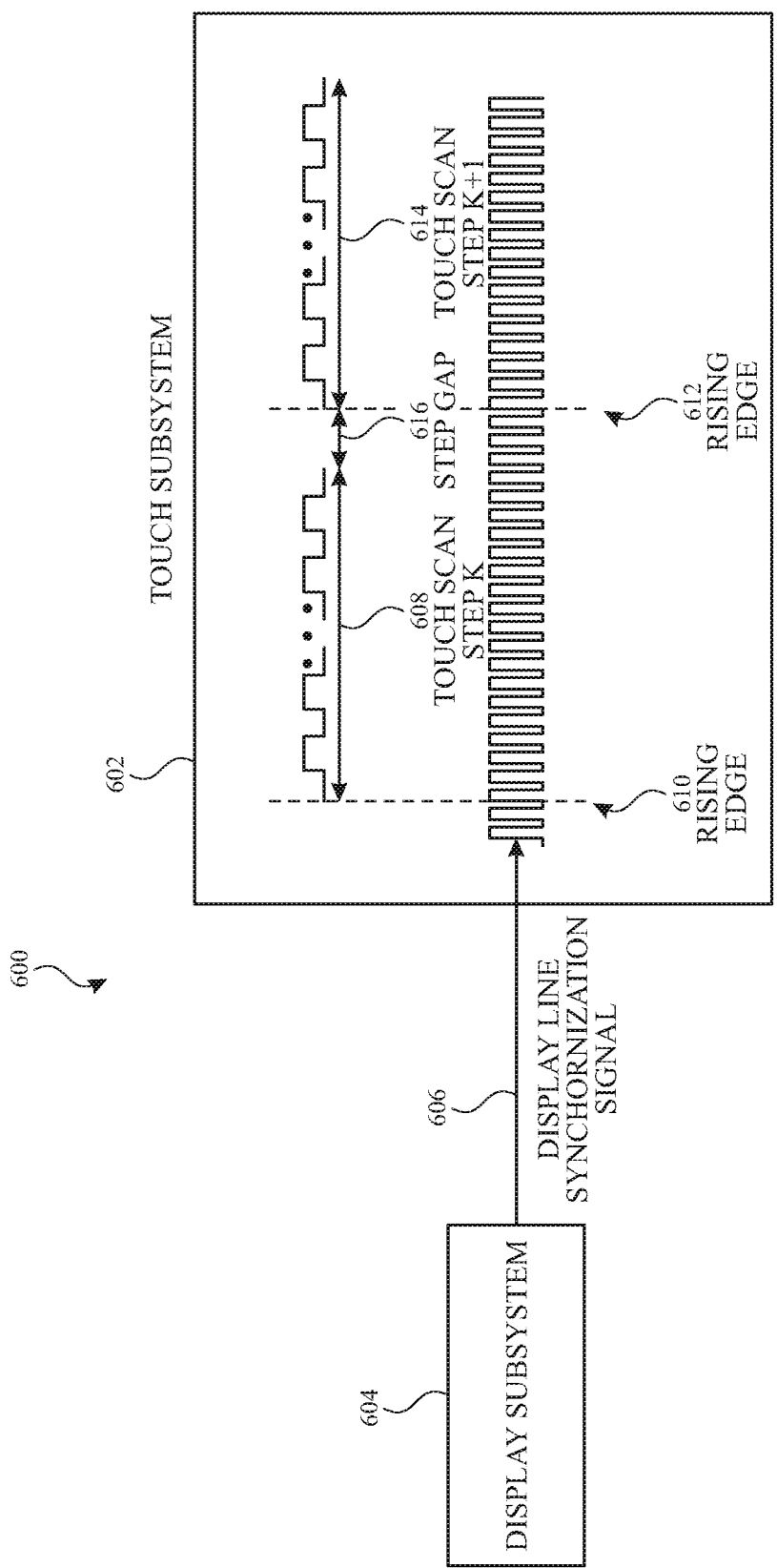
FIG. 6 illustrates and exemplary block diagram illustrating synchronization of a display subsystem and a touch subsystem according to examples of the disclosure.

In order to decouple the touch sensing frequency and the display frequency, while still maintaining awareness of display operations (and the resulting noise injected into the touch sensing system), the touch sensing system can be configured to be synchronized with the display system. For example, a display timing signal (e.g., a display line synchronization signal) can be used to trigger touch sensing operations and thereby synchronize touch and display operations for display noise mitigation. FIG. 6 illustrates and exemplary block diagram 600 illustrating synchronization of a display subsystem (e.g., corresponding to display ASIC 216) and a touch subsystem (e.g., corresponding to touch ASIC 201) according to examples of the disclosure. Touch subsystem 602 can receive a display line synchronization signal 606 from display subsystem 604. The display line synchronization signal 606 can, for example, indicate row updates and cause the updating of voltages on display lines of the display. The updating of voltages (that can be a noise interferer for touch sensing operations) can occur following the triggering edge with some predetermined offset (e.g., characterized empirically) in time to account for delay between the triggering edge of the display line synchronization signal and the voltage update on the data line. As shown in FIG. 6, a touch sensing operation 608 (e.g., a touch scan or a touch scan step of a touch scan), represented by a stimulation or excitation signal, can be triggered to begin by rising edge 610 of display line synchronization signal 606. Touch sensing operation 608 can occur concurrently (at least partially) with display operations, as indicated by the continued toggling of display line synchronization signal 606. Another touch sensing operation 614 (e.g., a touch scan or a touch scan step), can be triggered to begin on rising edge 612 of display line synchronization signal 606. Due to the nature of synchronizing the start of a touch sensing operation to a rising edge of display line synchronization signal 606, a pause period 616 (labeled "step gap" in FIG. 6) during which touch sensing operations are paused can separate between touch sensing operations (e.g., between touch scans or between touch scan steps). Although illustrated as updating in response to a rising edge of the display line synchronization signal, it should be understood that the update can be in response to a different triggering condition of the display line synchronization signal (e.g., a falling edge).

Figure 7:
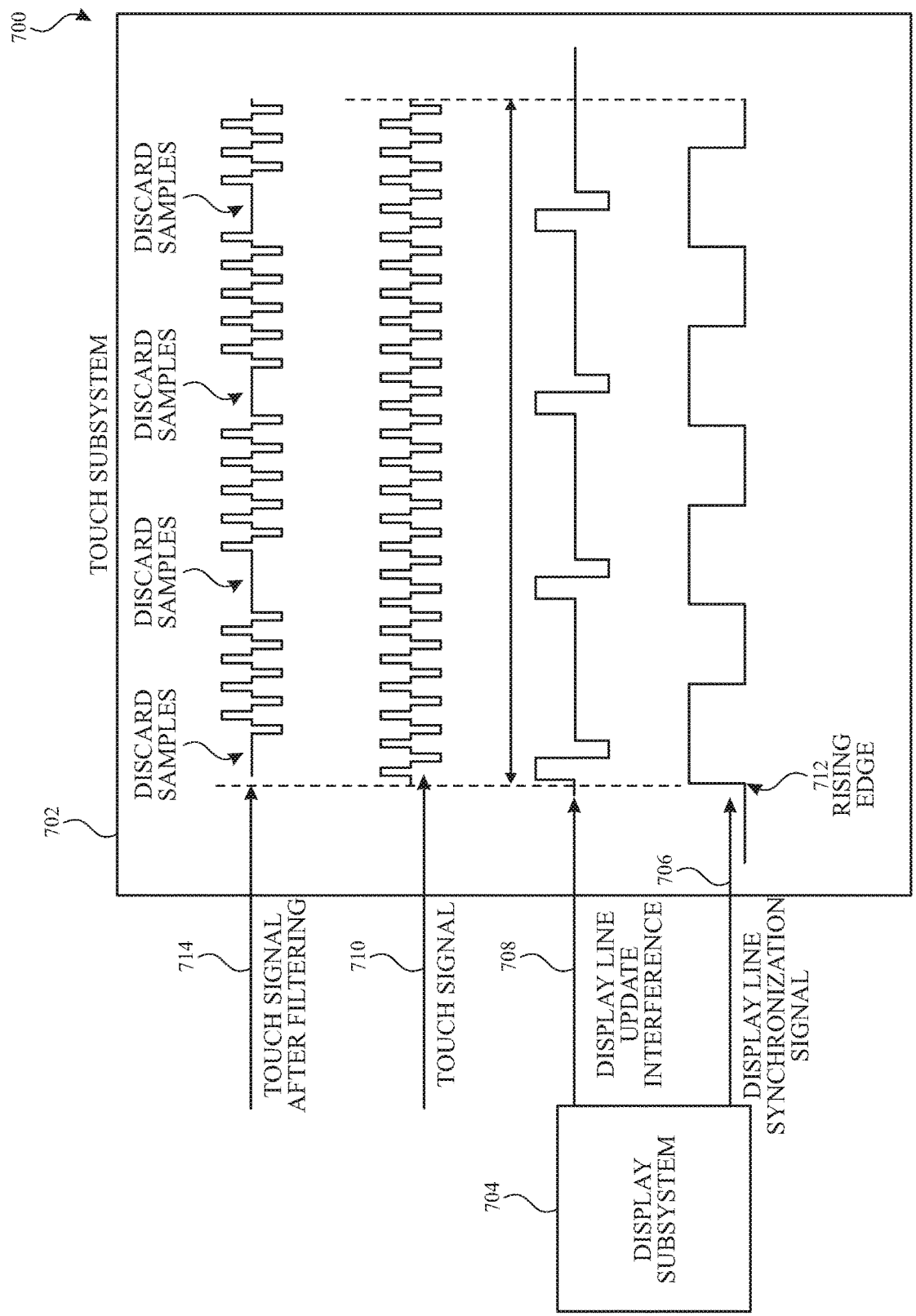
FIG. 7 illustrates and exemplary block diagram illustrating synchronization and an exemplary display noise mitigation technique for a display subsystem and a touch subsystem according to examples of the disclosure.

Synchronizing the start of the touch sensing operations to a rising edge of a display signal (e.g., display line synchronization signal 606) associated with the timing of a display noise interferer for the touch sensing system (as shown, for example, by the transient display data line signal in FIG. 5) can enable display noise mitigation techniques. However, it should be noted, that synchronizing the start of the touch sensing operation to the display line synchronization signal can provide some timing information for display noise mitigation (due to the timing relationship between the triggering edge of the display line synchronization signal and the voltage update (that results in noise for the touch sensing system), without requiring tight coupling of the display and touch sensing operations (e.g., without requiring the display frequency matching the touch sensing frequency). FIG. 7 illustrates and exemplary block diagram 700 illustrating synchronization and an exemplary display noise mitigation technique for a display subsystem (e.g., corresponding to display ASIC 216) and a touch subsystem (e.g., corresponding to touch ASIC 201) according to examples of the disclosure. Touch subsystem 702 can receive a display line synchronization signal 706 (e.g., corresponding to display line synchronization signal 606) from display subsystem 704. In a similar manner as shown in FIG. 6, a touch sensing operation 720 (e.g., a touch scan or a touch scan step), represented by an output touch signal 710, can be triggered to begin on rising edge 712 (or alternatively on a falling edge) of display line synchronization signal 706. Touch sensing operation 720 can occur concurrently (at least partially) with display operations (which can occur based on the line updates triggered in the display subsystem by toggling of display line synchronization signal 706). Display updates corresponding to the display line synchronization signal 706 can result in interferences 708 from display sub-system 704 coupling into touch electrodes driven and/or sensed by touch subsystem 702. As shown in FIG. 5, the rising edge of the display line synchronization signal can cause transient voltage to appear as display noise in the touch sensing sub-system 702.

The display noise can be mitigated based on the synchronization of the touch sensing operation to the display line synchronization signal, which also triggers the source of the display noise. Based on the knowledge of the display line synchronization signal rising edge 712 (either an initial rising edge or some offset from an initial rising edge), based on a known pattern and/or timing of the display line synchronization signal for the display, and/or based on a characterization of the relationship between the display data line noise induced in response to the display data line synchronization signal (e.g., a predetermined timing offset between the display data line synchronization signal and the display data line noise due to the display line update), the touch sensing subsystem can discard samples of the resulting touch signal 714 after filtering corresponding to the display induced noise. A similar operation can be performed for a discrete time sampling system that samples at the end of a settled period (or multiple times during the settled period), based further on the touch sensing frequency. As illustrated in FIG. 7, the discarded samples can correspond in time with (and thus have the same periodicity as) the display line update interference 708 at (or within a threshold time of) the rising edge of the display line synchronization signal 706.

In some examples, the system can be designed to discard samples based on a characterization of the display noise. For example, the display noise from a display line update can be characterized and modeled. In some examples, the model can be a first order model in which the transient behavior and settling (e.g., as shown in FIG. 5) can have a characteristic shape as a function of time (e.g., with a measured offset from the rising edge of the display line synchronization signal), which could be represented mathematically as a function, a(t), for a specific display technology. In the model, the display data line voltage can cause amplitude modulations (depending on the voltage driven to a specific display pixel), such that the display noise injected into the touch system can be represented as $A_k \times a(t)$, where a(t) can be the modeled display noise waveform and $A_k$ can represent an amplitude scaling factor indexed to k. For example, as shown in FIG. 5, the noise can be generally represented by a function a(t) that spikes in response to the rising edge of the display line synchronization signal and then settles down, but can be amplitude scaled as a function of the image. In some examples, at times when the function a(t) is within a threshold voltage of zero (thereby introducing a relatively small amount of noise), the corresponding sample of the touch sensor panel can be used for touch sensing operations. At times when the function a(t) is above the threshold voltage from zero (thereby introducing a relatively large amount of noise), the corresponding sample of the touch sensor panel can be discarded. In a conservative application, setting this threshold voltage lower can provide for reduced noise samples, but at the cost of fewer samples. In a more liberal application, setting the threshold higher can allow more noise per sample, but can provide for more samples for a touch sensing operation. The threshold can be set based on the specific requirements of the application. In some cases, the threshold can be set to maximize SNR for the application.

Although the described as a relatively simple first order model, $A_k \times a(t)$, it should be understood that the characterization and modeling of noise from display can be more complex. In some examples, the characterization can be a function of the touch sensing frequency. Thus, the filtering of touch sensing measurements can be a function of the touch sensing frequency as well as time. In some examples, the modeling can be a function of a location of the touch electrode. For example, noise may couple from the display into a particular touch electrode differently and therefore, the model a(t) may be a function of position of the touch electrode in the touch sensor panel and/or the location of the display row being updated (e.g., a class of functions $a_1(t)$, $a_2(t)$, etc. indexed based on the location of the touch electrode and/or the display row being updated).

In some examples, rather than a binary-type of filtering in which samples are either used for touch sensing operations or discarded, in some examples, a window (or a group of sub-windows) can be designed to mitigate display noise (by removing or reducing noise). The display noise can be mitigated by characterizing the display noise and using the window (or one or more sub-windows) to annihilate the display noise without losing the touch signal (e.g., applying the window to touch samples to filter out the display noise). It is understood that ideally the windowing of touch samples can remove the noise in its entirety without losing the touch signal, but in some examples the noise may be reduced by partially removing the noise rather than removing the noise entirely. Additionally, it should be understood that in some examples, the noise removal can cause loss of some of the touch signal. In some examples, the window can be designed to avoid loss of touch signal by being more conservative about removing noise, trading off some noise removal. In some examples, the window can be designed to be more liberal about removing noise, trading off some loss of touch signal. Using a window can enable continuous sampling and/or processing of the touch signals to improve SNR of touch measurements and to improve signal processing efficiency.

Figure 8A:
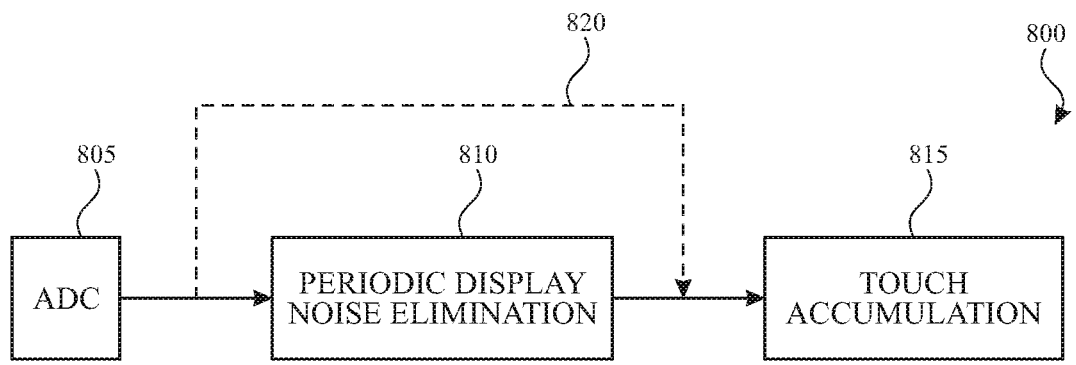
FIG. 8A-8C illustrate exemplary windows for display line aware display noise mitigation according to examples of the disclosure.
Figure 8B:
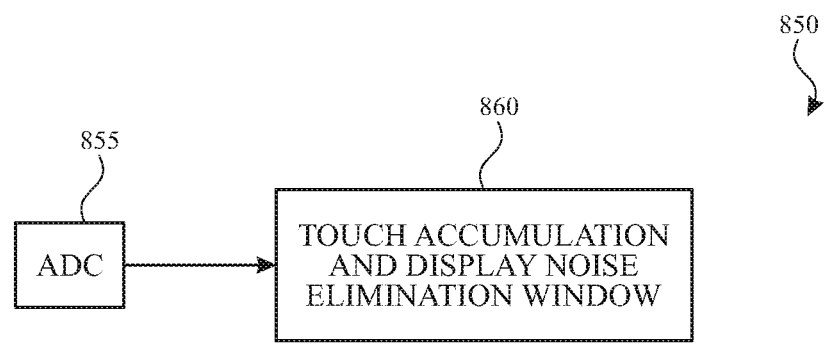
Figure 8C:
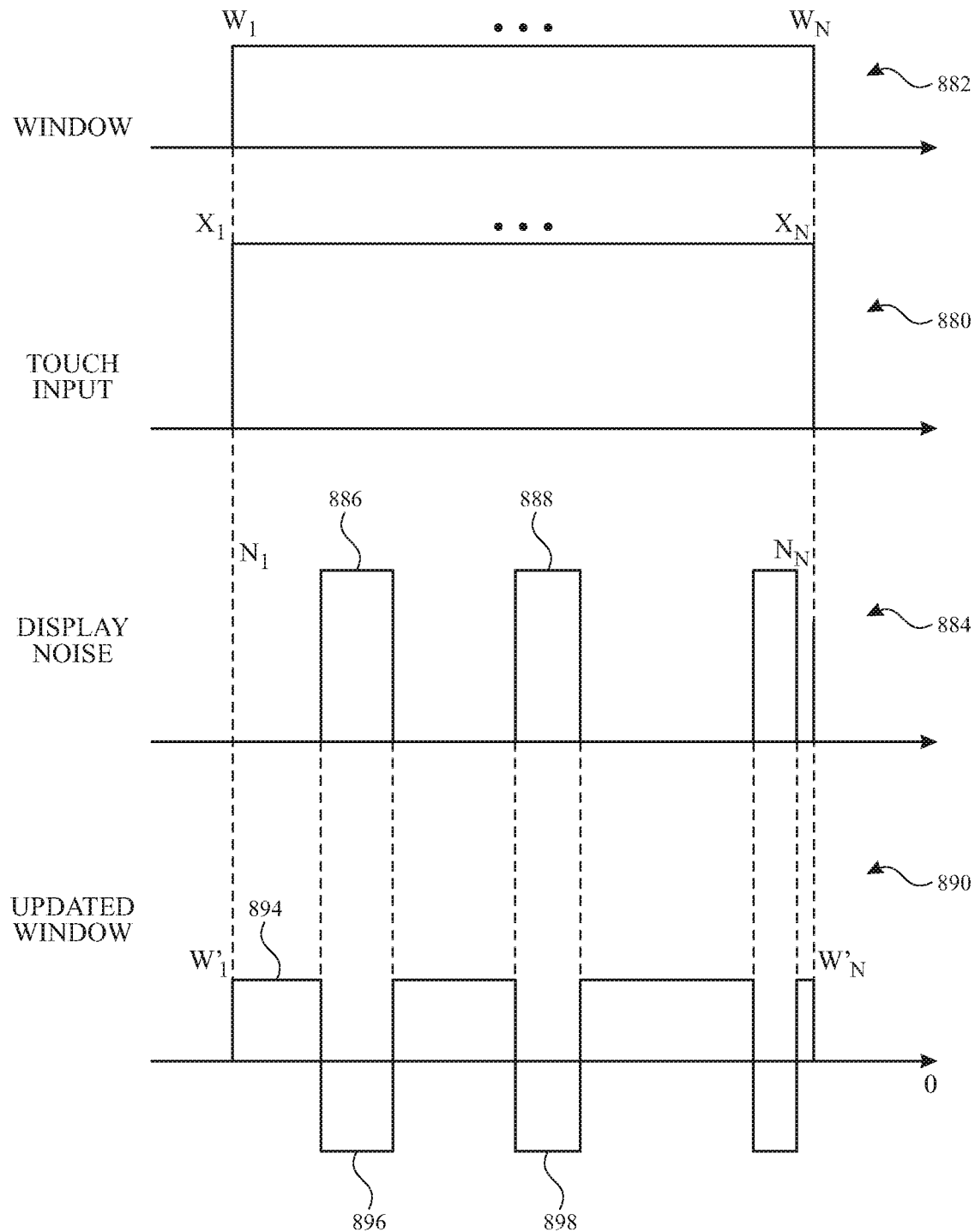

FIG. 8A-8C illustrate exemplary windows for display line aware display noise mitigation according to examples of the disclosure. FIG. 8A illustrates exemplary block diagram 800 for touch sensing and display noise mitigation according to examples of the disclosure. Block diagram 800 can include an analog to digital converter (ADC) 805 representative of the output of a sense channel measuring a touch electrode. Block diagram 800 can also include a display noise elimination circuit 810. Display noise elimination circuit 810 can apply a window to touch samples output by ADC 805 eliminate display noise. Although not shown, it should be understood that display noise elimination circuit 810 can receive timing information (e.g., a display line synchronization signal and/or other information). The window can be applied as a function of time (based on the display line synchronization signal) so as to align the periodicity of the display noise with the periodicity of the annihilation sub-windows applied to samples within the window. After removing the display noise from each sample using a sub-window of the window to annihilate display noise, the remaining signal (with mitigated or eliminated display noise) can be accumulated by touch accumulator 815 (summing the filtered samples after applying the sub-windows). Display noise elimination circuit 810 and/or touch accumulator 815 can be implemented as one or more signal processing circuits (e.g., digital signal processor of touch ASIC 201 or in digital logic circuitry such as a programmable logic device or field programmable gate array). In some examples, the digital signal processing described herein can be implemented in software, hardware, firmware or a combination thereof.

FIG. 8B illustrates another exemplary block diagram 850 for touch sensing and display noise mitigation according to examples of the disclosure. Block diagram 850 can include ADC 855 (e.g., corresponding to ADC 805), but rather than first applying the window to mitigate display noise and subsequently accumulating the samples, both operations can be combined such that the display noise windowing and touch accumulation can be combined into a touch accumulation and display noise elimination window 860. It should be understood that the accumulated and windowed result of the display noise elimination and touch accumulation in FIGS. 8A and 8B can be the same.

Although the display noise mitigation (and/or touch accumulation) are illustrated in a digital domain (e.g., implemented in a signal processing circuit such as a digital signal processor of touch ASIC 201 or in digital logic circuitry such as a programmable logic device or gate array), it should be understood that, in some examples, the display noise mitigation and/or touch accumulation can be implemented with analog circuitry as well (e.g., prior to analog-to-digital conversion).

In some examples, the window function (or the application of sub-windows) can be applied to all samples. For example, for a system that accumulates 100 samples during a touch sensing scan, the window can include weights applied to each of the samples (e.g., 100 weights for 100 samples). In some examples, some samples can be windowed and other samples can be discarded (e.g., as described above with reference to FIG. 7) and/or other samples can be accumulated (bypassing the filtering by the window). For example, samples acquired during the settled portions illustrated in FIG. 5, may not require much, if any, filtering due the minimal amount (or absence) of noise, and samples acquired at and near the peak in the data line noise can include a significant amount of noise which can overwhelm the touch signal. As a result, in some examples, samples taken during these settled portions could be provided from ADC 805 to touch accumulator 815 directly without filtering (e.g., using bypass path 820 to bypass the display noise elimination circuit 810). In a similar fashion, in some examples, samples taken during noisier portions of the display update (e.g., the transient spike) can be discarded (e.g., zeroed out for accumulation or otherwise ignored).

FIG. 8C illustrates various exemplary plots illustrative of an exemplary window for display line aware display noise mitigation. Plot 880 shows an exemplary touch input signal, x(t), which can be sampled 1:N times. For simplicity of illustration and description, a square wave is shown, but other waveforms are possible (e.g., sine, saw-tooth, trapezoid, etc.). Assuming an absence of noise, the window can be designed as matched filters with the window represented in plot 882 by signal, w(t), with 1:N coefficients to accumulate the touch signal samples. In practice, however, many touch systems can receive display noise interference of a periodic nature. For example, plot 884 includes a representation of display noise, n(t), with 1:N samples taken during a characterization of the display noise. As shown in plot 884, the display noise can have a periodic behavior as a function of the display line synchronization signal. An updated window, w'(t), can be designed based on the characterized display noise to annihilate the display noise. For example, window coefficients in region 896 of plot 890 can be designed to filter out the display noise in region 886 of plot 884. Likewise, the periodicity of the updated window in region 898 can match the periodicity of the display noise in region 888 of plot 884. When there is minimal or no noise shown of plot 884, the corresponding coefficients of the updated window shown in plot 890 (e.g., at region 894) can be the same as the window coefficients for accumulation purposes without further filtering (as there is no noise to remove). The application of the window and accumulation of the samples (indexed to i) can be represented mathematically as $\Sigma_i x_i(t) \cdot w_i'(t)$. It should be understood that the waveforms in FIG. 8C are simplified examples for ease of description.

Figure 9:
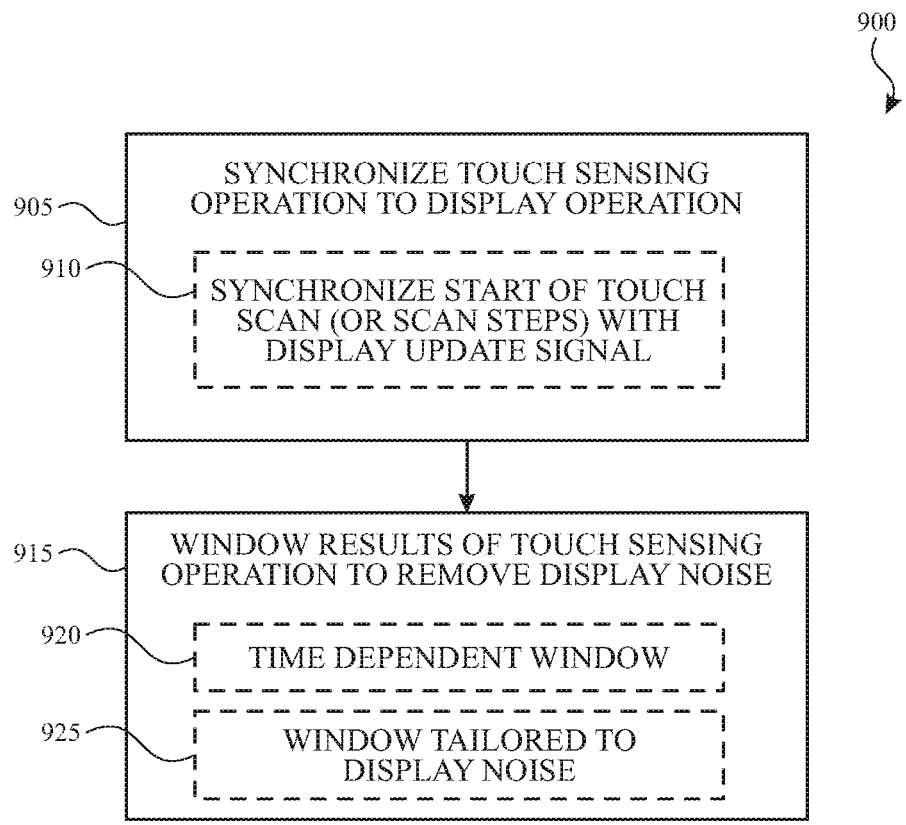
FIG. 9 illustrates an exemplary process for display line aware noise mitigation according to examples of the disclosure.

FIG. 9 illustrates an exemplary process 900 for display line aware noise mitigation according to examples of the disclosure. At 905, touch sensing operations and display operations can be synchronized. For example, as described herein, the synchronization can be achieved, at 910, by beginning the touch sensing scan or scan step in response to (optionally with some delay) a display synchronization signal. For example, the display synchronization signal can be a display line synchronization signal and the rising edge can trigger the beginning of the touch sensing operation. Although a rising edge is primarily described as the trigger, other transition points of the waveform or other offsets can be used for synchronization. Additionally, as described herein the display line synchronization signal can provide an indication of the timing of display noise injected into the touch sensing system (e.g., from the display data line update).

At 915, the touch measurements (e.g., from sampling the touch electrodes) can be windowed in order to mitigate the display noise. For example, as described with respect to FIGS. 8A-8B, the window can be applied prior to or along with touch accumulation. To achieve display noise mitigation, the window can be applied in a time-dependent manner (920). For example, as described above, the touch operation can be synchronized to rising edges of the display synchronization signal, but different touch sensing operations may not begin on the same rising edge (e.g., corresponding to the same point within the display refresh operation). Accordingly, in order to account for differences between how touch sensing scans may be impacted by display noise (due to offsets in time), the application of the window can take into account the display synchronization timing to properly apply the window (perhaps using a time-offset window) for display noise annihilation. Additionally, the window can be tailored to the display noise (924). For example, as described herein, different characteristics of the display can inject different amounts of noise into the touch system. The window can be designed to annihilate display noise introduced from periodic aggressors, such as display line data updates. The display noise can be characterized (e.g., to determine magnitude of the noise, the shape of the noise waveform, and the timing of the noise) and a window or multiple sub-windows can be designed to annihilate the characterized noise. Additionally or alternatively, samples impacted by display noise can be discarded based on timing information without requiring a tailored window.

Figure 10:
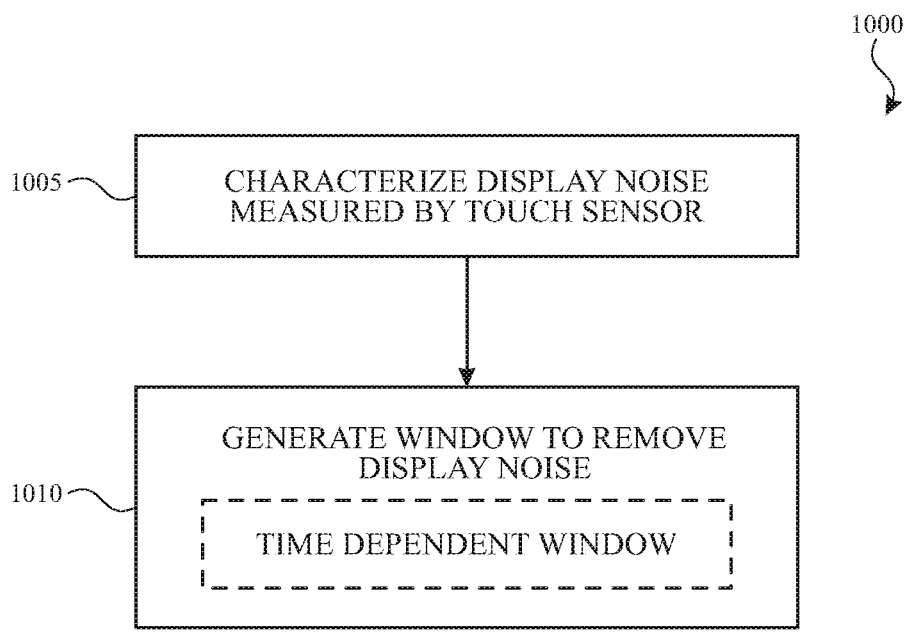
FIG. 10 illustrates an exemplary process to generate a window according to examples of the disclosure.

FIG. 10 illustrates an exemplary process 1000 to generate a window according to examples of the disclosure. At 1005, display noise injected into the touch sensor panel can be measured to characterize the display noise. At 1010, a window can be generated that can be designed to mitigate or remove display noise. The application of the window can be time-dependent (1015) rather than static, such that the window can first be aligned with the touch sensing samples based on the synchronization signal from the signal (e.g., as described with respect to process 900).

Therefore, according to the above, some examples of the disclosure are directed to an apparatus. The apparatus can comprise a receiver channel configured to measure a touch electrode during touch sensing operations to generate a plurality of touch samples and processing circuitry. The processing circuitry can be programmed to (configured to): synchronize the touch sensing operations with a display timing signal associated with a display noise such that the touch sensing operations occur at least partially concurrently with display operations and such that the display noise couples into the touch samples; and apply a window to the plurality of touch samples to remove the display noise from the plurality of touch samples. Additionally or alternatively to one or more of the examples disclosed above, in some examples, applying the window to the plurality of touch samples can be time-dependent on the display timing signal associated with the display noise. Additionally or alternatively to one or more of the examples disclosed above, in some examples, the window can comprise one or more annihilation sub-windows and a periodicity of annihilator sub-windows in the window can match a periodicity of the display noise. Additionally or alternatively to one or more of the examples disclosed above, in some examples, the touch sensing operations can include a first touch scan step and a second touch scan step. Synchronizing the touch sensing operations with the display timing signal can comprise: beginning the first touch scan step with a first signal transition of the display timing signal corresponding to a first display line update; and beginning the second touch scan step with a second signal transition of the display timing signal corresponding to a second display line update different from the first signal transition of the display timing signal corresponding to the first display line update. Additionally or alternatively to one or more of the examples disclosed above, in some examples, applying the window to the plurality of touch samples to remove the display noise from the plurality of touch samples can comprise: applying the window to touch samples generated from the first touch scan step; and applying the window to touch samples generated from the second touch scan step. The coefficients of the window as applied to the touch samples generated from the second touch scan step can be offset in time relative to the coefficients of the window as applied to the touch samples generated from the first touch scan step. Additionally or alternatively to one or more of the examples disclosed above, in some examples, the first signal transition can be a first rising edge of the display timing signal and the second signal transition can be a second rising edge of the display timing signal. Additionally or alternatively to one or more of the examples disclosed above, in some examples, the window can comprise one or more annihilation sub-windows and applying the window to the plurality of touch samples can comprise applying the one or more annihilation sub-windows to a first subset of the plurality of touch samples corresponding to a transient period of a display data line signal without applying the one or more annihilation sub-windows to a second subset of the plurality of touch samples corresponding to a settled period of the display data line signal. Additionally or alternatively to one or more of the examples disclosed above, in some examples, the processing circuitry can be further programmed to: accumulate the plurality of touch samples to determine a touch measurement. Additionally or alternatively to one or more of the examples disclosed above, in some examples, applying the window to the plurality of touch samples to remove the display noise from the plurality of touch samples can occur prior to accumulating the plurality of touch samples to determine the touch measurement. Additionally or alternatively to one or more of the examples disclosed above, in some examples, applying the window to the plurality of touch samples to remove the display noise from the plurality of touch samples and accumulating the plurality of touch samples to determine the touch measurement can occur in one operation.

Some examples of the disclosure are directed to a method. The method can comprise: synchronizing touch sensing operations with a display timing signal associated with a display noise such that the touch sensing operations occur at least partially concurrently with display operations and such that the display noise couples into touch samples generated during the sensing operations; and applying a window to the plurality of touch samples to remove the display noise from the plurality of touch samples. Additionally or alternatively to one or more of the examples disclosed above, in some examples, applying the window to the plurality of touch samples can be time-dependent on the display timing signal associated with the display noise. Additionally or alternatively to one or more of the examples disclosed above, in some examples, the window can comprise one or more annihilation sub-windows and a periodicity of the one or more annihilation sub-windows in the window can match a periodicity of the display noise. Additionally or alternatively to one or more of the examples disclosed above, in some examples, the touch sensing operations can include a first touch scan step and a second touch scan step. Synchronizing the touch sensing operations with the display timing signal can comprise: beginning the first touch scan step with a first signal transition of the display timing signal corresponding to a first display line update; and beginning the second touch scan step with a second signal transition of the display timing signal corresponding to a second display line update different from the first signal transition of the display timing signal corresponding to the first display line update. Additionally or alternatively to one or more of the examples disclosed above, in some examples, applying the window to the plurality of touch samples to remove the display noise from the plurality of touch samples can comprise: applying the window to touch samples generated from the first touch scan step; and applying the window to touch samples generated from the second touch scan step. The coefficients of the window as applied to the touch samples generated from the second touch scan step can be offset in time relative to the coefficients of the window as applied to the touch samples generated from the first touch scan step. Additionally or alternatively to one or more of the examples disclosed above, in some examples, the first signal transition can be a first rising edge of the display timing signal and the second signal transition can be a second rising edge of the display timing signal. Additionally or alternatively to one or more of the examples disclosed above, in some examples, the window can comprise one or more annihilation sub-windows and applying the window to the plurality of touch samples can comprise applying the one or more annihilation sub-windows to a first subset of the plurality of touch samples corresponding to a transient period of a display data line signal without applying the one or more annihilation sub-windows to a second subset of the plurality of touch samples corresponding to a settled period of the display data line signal. Additionally or alternatively to one or more of the examples disclosed above, in some examples, the method can further comprise: accumulating the plurality of touch samples to determine a touch measurement. Additionally or alternatively to one or more of the examples disclosed above, in some examples, applying the window to the plurality of touch samples to remove the display noise from the plurality of touch samples can occur prior to accumulating the plurality of touch samples to determine the touch measurement. Additionally or alternatively to one or more of the examples disclosed above, in some examples, applying the window to the plurality of touch samples to remove the display noise from the plurality of touch samples and accumulating the plurality of touch samples to determine the touch measurement can occur in one operation. Some examples of the disclosure are directed to a non-transitory computer readable storage medium. The non-transitory computer readable storage medium can store instructions, which when executed by one or more processors, can cause the one or more processors to perform any of the above methods.

Some examples of the disclosure are directed to a method. The method can comprise: characterizing display noise coupling into a touch sensor panel; and generating, based on characterization of the display noise coupling into the touch sensor panel, a window configured to remove the display noise coupling into the touch sensor panel. Additionally or alternatively to one or more of the examples disclosed above, in some examples, the window can be time-dependent and referenced to the display noise. Additionally or alternatively to one or more of the examples disclosed above, in some examples, the display noise can correspond to signals applied to display lines in response to a display line synchronization signal. Additionally or alternatively to one or more of the examples disclosed above, in some examples, a periodicity of the window can correspond in time to a periodicity of the display noise coupling into the touch sensor panel. Additionally or alternatively to one or more of the examples disclosed above, in some examples, characterizing the noise can comprise modeling the display noise coupling to the touch sensor panel as a function scalable according to a data line voltage. Additionally or alternatively to one or more of the examples disclosed above, in some examples, the function can include an impulse response that subsequently decays to a settled value. Some examples of the disclosure are directed to a non-transitory computer readable storage medium. The non-transitory computer readable storage medium can store instructions, which when executed by one or more processors, can cause the one or more processors to perform any of the above methods. Some examples of the disclosure are directed to an apparatus comprising a memory storing instructions and one or more processors. The one or more processors can be programmed to execute the instructions to perform any of the above methods.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. An apparatus comprising:
a receiver channel configured to measure a touch electrode during touch sensing operations to generate a plurality of touch samples; and
processing circuitry configured to:
synchronize the touch sensing operations with a display timing signal associated with a display noise such that the touch sensing operations occur at least partially concurrently with display operations and such that the display noise couples into one or more touch samples of the plurality of touch samples; and
apply a window function to the plurality of touch samples based on the display timing signal to remove the display noise from the plurality of touch samples.

2. The apparatus of claim 1, wherein applying the window function to the plurality of touch samples is time-dependent on the display timing signal associated with the display noise.

3. The apparatus of claim 1, wherein the window function comprises one or more annihilation sub-windows and wherein a periodicity of the one or more annihilation sub-windows in the window function matches a periodicity of the display noise.

4. The apparatus of claim 1, wherein the touch sensing operations include a first touch scan step and a second touch scan step, wherein synchronizing the touch sensing operations with the display timing signal comprises:
beginning the first touch scan step with a first signal transition of the display timing signal corresponding to a first display line update; and
beginning the second touch scan step with a second signal transition of the display timing signal corresponding to a second display line update different from the first signal transition of the display timing signal corresponding to the first display line update.

5. The apparatus of claim 4, wherein applying the window function to the plurality of touch samples to remove the display noise from the plurality of touch samples comprises:
applying the window function to touch samples generated from the first touch scan step; and applying the window function to touch samples generated from the second touch scan step;

wherein coefficients of the window function as applied to the touch samples generated from the second touch scan step are offset in time relative to the coefficients of the window function as applied to the touch samples generated from the first touch scan step.

6. The apparatus of claim 4, wherein the first signal transition is a first rising edge of the display timing signal and the second signal transition is a second rising edge of the display timing signal.

7. The apparatus of claim 1, wherein applying the window function to the plurality of touch samples comprises applying annihilation sub-windows to a first subset of the plurality of touch samples corresponding to a transient period of a display data line signal without applying annihilation sub-windows to a second subset of the plurality of touch samples corresponding to a settled period of the display data line signal.

8. The apparatus of claim 1, the processing circuitry further configured to:

accumulate the plurality of touch samples to determine a touch measurement.

9. The apparatus of claim 8, wherein applying the window function to the plurality of touch samples to remove the display noise from the plurality of touch samples occurs prior to accumulating the plurality of touch samples to determine the touch measurement.

10. The apparatus of claim 8, wherein applying the window function to the plurality of touch samples to remove the display noise from the plurality of touch samples and accumulating the plurality of touch samples to determine the touch measurement occur in one operation.

11. A method comprising:

synchronizing touch sensing operations with a display timing signal associated with a display noise such that the touch sensing operations occur at least partially concurrently with display operations and such that the display noise couples into one or more touch samples of a plurality of touch samples generated during the touch sensing operations; and applying a window function to the plurality of touch samples based on the display timing signal to remove the display noise from the plurality of touch samples.

12. The method of claim 11, wherein applying the window function to the plurality of touch samples is time-dependent on the display timing signal associated with the display noise.

13. The method of claim 11, wherein the window function comprises one or more annihilation sub-windows and wherein a periodicity of the one or more annihilation sub-windows in the window function matches a periodicity of the display noise.

14. The method of claim 11, wherein the touch sensing operations include a first touch scan step and a second touch scan step, wherein synchronizing the touch sensing operations with the display timing signal comprises:

beginning the first touch scan step with a first signal transition of the display timing signal corresponding to a first display line update; and beginning the second touch scan step with a second signal transition of the display timing signal corresponding to a second display line update different from the first signal transition of the display timing signal corresponding to the first display line update.

15. The method of claim 14, wherein applying the window function to the plurality of touch samples to remove the display noise from the plurality of touch samples comprises:

applying the window function to touch samples generated from the first touch scan step; and applying the window function to touch samples generated from the second touch scan step;

wherein coefficients of the window function as applied to the touch samples generated from the second touch scan step are offset in time relative to the coefficients of the window function as applied to the touch samples generated from the first touch scan step.

16. The method of claim 14, wherein the first signal transition is a first rising edge of the display timing signal and the second signal transition is a second rising edge of the display timing signal.

17. The method of claim 11, wherein the window function comprises one or more annihilation sub-windows and wherein applying the window function to the plurality of touch samples comprises applying the one or more annihilation sub-windows to a first subset of the plurality of touch samples corresponding to a transient period of a display data line signal without applying the one or more annihilation sub-windows to a second subset of the plurality of touch samples corresponding to a settled period of the display data line signal.

18. The method of claim 11, further comprising:

accumulating the plurality of touch samples to determine a touch measurement.

19. The method of claim 18, wherein applying the window function to the plurality of touch samples to remove the display noise from the plurality of touch samples occurs prior to accumulating the plurality of touch samples to determine the touch measurement.

20. The method of claim 18, wherein applying the window function to the plurality of touch samples to remove the display noise from the plurality of touch samples and accumulating the plurality of touch samples to determine the touch measurement occur in one operation.

21. A non-transitory computer readable storage medium storing instructions, which when executed by one or more processors, cause the one or more processors to perform a method comprising:

synchronizing touch sensing operations with a display timing signal associated with a display noise such that the touch sensing operations occur at least partially concurrently with display operations and such that the display noise couples into one or more touch samples of a plurality of touch samples generated during the touch sensing operations; and applying a window function to the plurality of touch samples based on the display timing signal to remove the display noise from the plurality of touch samples.

* * * * *